US012207716B1

(12) United States Patent
Li

(10) Patent No.: US 12,207,716 B1
(45) Date of Patent: Jan. 28, 2025

(54) DOUBLE-RING MAGNETIC MOBILE PHONE HOLDER

(71) Applicant: Shenzhen Leaderment Technology Co., Ltd., Shenzhen (CN)

(72) Inventor: Chunbin Li, Shenzhen (CN)

(*) Notice: Subject to any disclaimer, the term of this patent is extended or adjusted under 35 U.S.C. 154(b) by 0 days.

(21) Appl. No.: 18/814,971

(22) Filed: Aug. 26, 2024

(30) Foreign Application Priority Data

Oct. 31, 2023 (CN) .......................... 202322946921.4

(51) Int. Cl.
| | | |
|---|---|---|
| *A45C 11/00* | (2006.01) |
| *A45C 13/00* | (2006.01) |
| *F16M 11/04* | (2006.01) |
| *F16M 11/20* | (2006.01) |
| *F16M 11/08* | (2006.01) |
| *F16M 13/04* | (2006.01) |

(52) U.S. Cl.
CPC ............ *A45C 11/00* (2013.01); *A45C 13/007* (2013.01); *F16M 11/041* (2013.01); *F16M 11/2021* (2013.01); *A45C 2011/002* (2013.01); *F16M 11/08* (2013.01); *F16M 13/04* (2013.01); *F16M 2200/022* (2013.01)

(58) Field of Classification Search
CPC . A45C 11/00; A45C 13/007; A45C 2011/002; F16M 11/041; F16M 11/08
USPC ............................................. 248/206.5, 309.4
See application file for complete search history.

(56) References Cited

U.S. PATENT DOCUMENTS

| | | | | |
|---|---|---|---|---|
| 9,723,910 | B2 * | 8/2017 | Due ........................... | A45F 5/00 |
| 11,265,035 | B1 | 3/2022 | Zhang | |
| 11,295,035 | B2 * | 4/2022 | Xin ...................... | G06F 21/6245 |
| 11,382,443 | B2 * | 7/2022 | Priefert ................. | B65D 25/22 |
| 11,658,694 | B1 | 5/2023 | Wang | |
| 11,710,988 | B2 * | 7/2023 | Larsson .................. | H02J 50/90 |
| | | | | 320/108 |
| 11,784,675 | B2 * | 10/2023 | Zhang ..................... | H04M 1/04 |
| | | | | 455/575.1 |
| 11,796,128 | B1 * | 10/2023 | Ma ........................ | F16M 11/041 |
| 12,031,669 | B2 * | 7/2024 | Whitten ............... | F16M 13/022 |
| 12,089,727 | B2 * | 9/2024 | Liu ........................... | A45F 5/10 |

FOREIGN PATENT DOCUMENTS

| | | |
|---|---|---|
| CN | 215897788 U | 2/2022 |
| CN | 217904451 U | 11/2022 |

* cited by examiner

*Primary Examiner* — Todd M Epps

(57) ABSTRACT

The present invention discloses a double-ring magnetic mobile phone holder, which comprises: a base; a first ring, wherein a first end of the first ring is hinged to the base, and the first ring is accommodated in an inner side of the base in a first state; a second ring, wherein the second ring is hinged to a second end of the first ring, the first end is symmetrical to the second end, and the second ring is attached to a top of the first ring in a first state; and a magnetic assembly mounted in the base, wherein the magnetic assembly comprises a first magnet, an iron sheet, and a second magnet stacked in sequence, the first magnet is configured to magnetically attract a mobile phone, and the second magnet is configured to magnetically attract external metal.

10 Claims, 3 Drawing Sheets

DOUBLE-RING MAGNETIC MOBILE PHONE HOLDER

CROSS REFERENCE TO RELATED APPLICATION

This application claims priority benefit of Chinese Patent Application No. 202322946921.4, filed on Oct. 31, 2023, and the entire contents of which are incorporated herein by reference.

TECHNICAL FIELD

The present invention relates to the technical field of mobile phone holders, and in particular, to a double-ring magnetic mobile phone holder.

BACKGROUND

With the development of science and technology and the popularity of smart phones, there are more and more accessories for mobile phones. A ring holder that can not only prevent a mobile phone from accidentally falling when in use but also serve as a support frame is deeply favored by users.

The existing ring holder is usually adhered to the back of a mobile phone through the adhesive, and then a ring is arranged for a finger of a user to pass through or for forming a support frame to support the mobile phone. However, this ring holder has a small adjustable support angle and a limited use range. Meanwhile, with the development of mobile phones, some existing mobile phones have the function of magnetic attraction, which puts higher requirements on the mobile phone holders to meet the diverse demands of users.

SUMMARY

A primary objective of the present invention is to provide a double-ring magnetic mobile phone holder, which aims to solve the problem that the existing ring holder has a small support angle.

To achieve the objective, the present invention provides a double-ring magnetic mobile phone holder, which comprises:
  a base;
  a first ring, wherein a first end of the first ring is hinged to the base, and the first ring is accommodated in an inner side of the base in a first state;
  a second ring, wherein the second ring is hinged to a second end of the first ring, the first end is symmetrical to the second end, and the second ring is attached to a top of the first ring in a first state; and
  a magnetic assembly mounted in the base, wherein the magnetic assembly comprises a first magnet, an iron sheet, and a second magnet stacked in sequence, the first magnet is configured to magnetically attract a mobile phone, and the second magnet is configured to magnetically attract external metal.

Optionally, a height of the second magnet is 0.6-0.8 times that of the first magnet.

Optionally, the height of the first magnet is set to 1.8-2.5 mm, a height of the iron sheet is set to 0.9-1.5 mm, and the height of the second magnet is set to 1.2-1.8 mm.

Optionally, the first magnet, the iron sheet, and the second magnet are all configured in a circular ring shape, the first magnet, the iron sheet, and the second magnet have the same inner diameter, an outer diameter of the first magnet is equal to that of the iron sheet, and the outer diameter of the first magnet is greater than that of the second magnet.

Optionally, the inner diameters of the first magnet, the iron sheet and the second magnet are set to 40-46 mm, the outer diameters of the first magnet and the iron sheet are set to 53-59 mm, and the outer diameter of the second magnet is set to 47-53 mm.

Optionally, the first ring is hinged to the base by a first rotating mechanism, the first rotating mechanism comprises a first rotating shaft mounted on the base, a first damping sleeve is sleeved outside the first rotating shaft, and the first ring is provided with a first rotating hole rotatably connected to the first damping sleeve.

Optionally, the second ring is hinged to the first ring by a second rotating mechanism, the second rotating mechanism comprises a second rotating shaft mounted on the first ring, a second damping sleeve is sleeved outside the second rotating shaft, and the second ring is provided with a second rotating hole rotatably connected to the second damping sleeve.

Optionally, the base comprises a bottom shell and an upper cover connected to each other, and the magnetic assembly is mounted on the bottom shell.

Optionally, the first magnet, the iron sheet, and the second magnet are adhered and fixed by adhesive.

Optionally, an outer side end of the upper cover is provided with a chamfer structure.

The present invention has the following beneficial effects: the structure of the existing ring holder has been improved, and the double-ring structure design can meet the multi-angle support requirements of the mobile phone and has high stability. In addition, the magnetic structure of the holder adopts a three-layer structure of a magnet, an iron sheet and a magnet, which can meet the requirements that one side of the holder attracts the mobile phone, and the other side of the holder attracts an external metal surface. Therefore, the hands of the user are freed, and the use is more convenient.

BRIEF DESCRIPTION OF DRAWINGS

To more clearly illustrate the technical solutions in the embodiments of the present invention or in the prior art, the drawings required to be used in the description of the embodiments or the prior art are briefly introduced below. It is obvious that the drawings in the description below are only some embodiments of the present invention, and those of ordinary skill in the art can obtain other drawings according to structures illustrated in these drawings without creative efforts.

Figure 1:
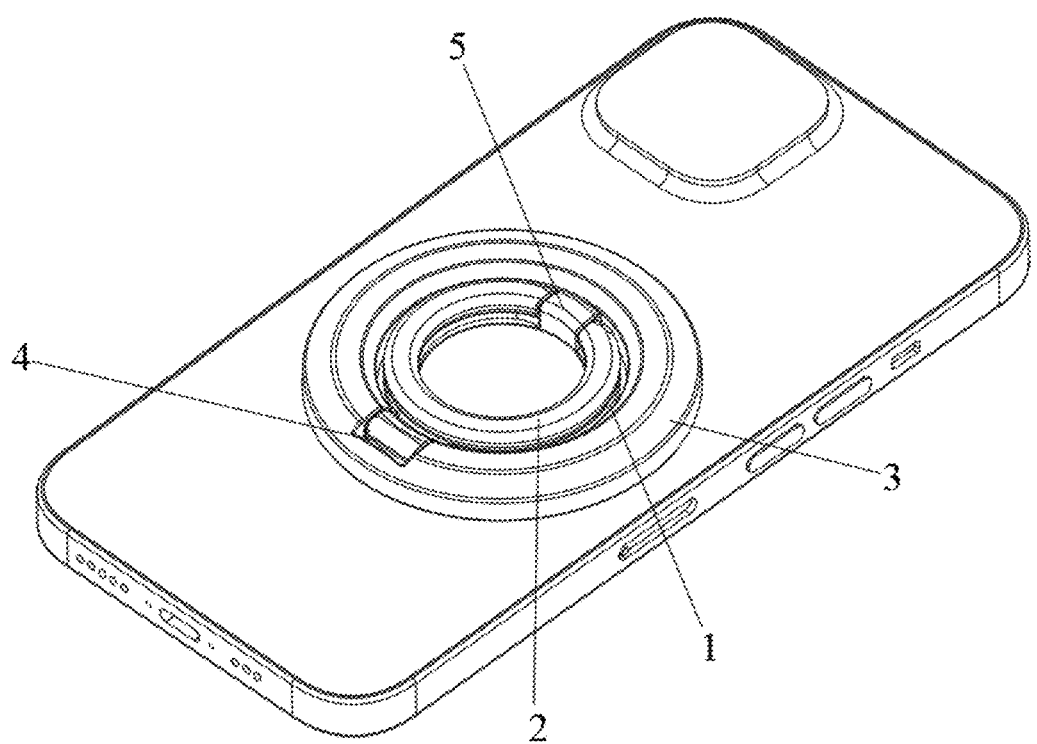
FIG. 1 is a schematic diagram of a structure of a double-ring magnetic mobile phone holder according to the present invention in a first state.
Figure 2:
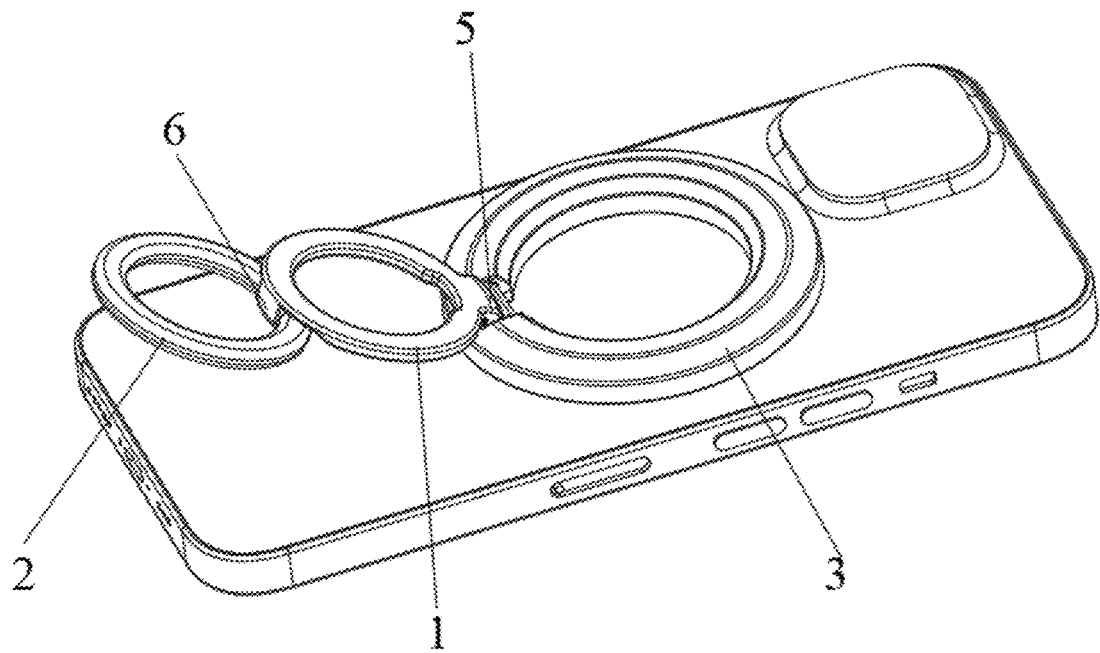
FIG. 2 is a schematic diagram of a structure of a double-ring magnetic mobile phone holder according to the present invention in a second state.
Figure 3:
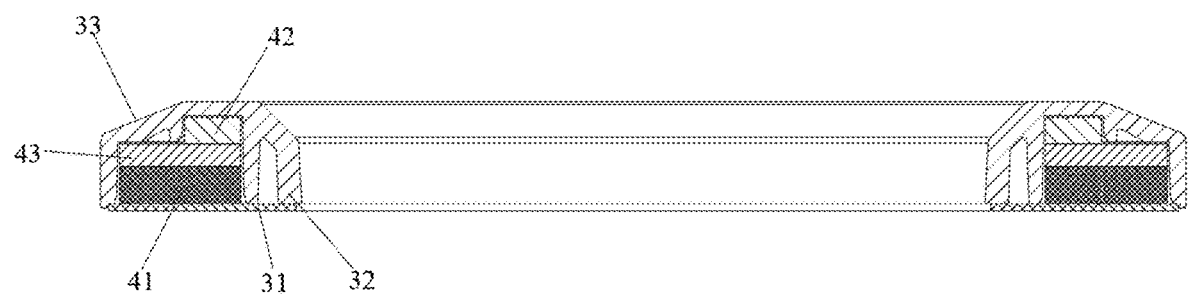
FIG. 3 is a cross-sectional view of a structure of a base according to the present invention.
Figure 4:
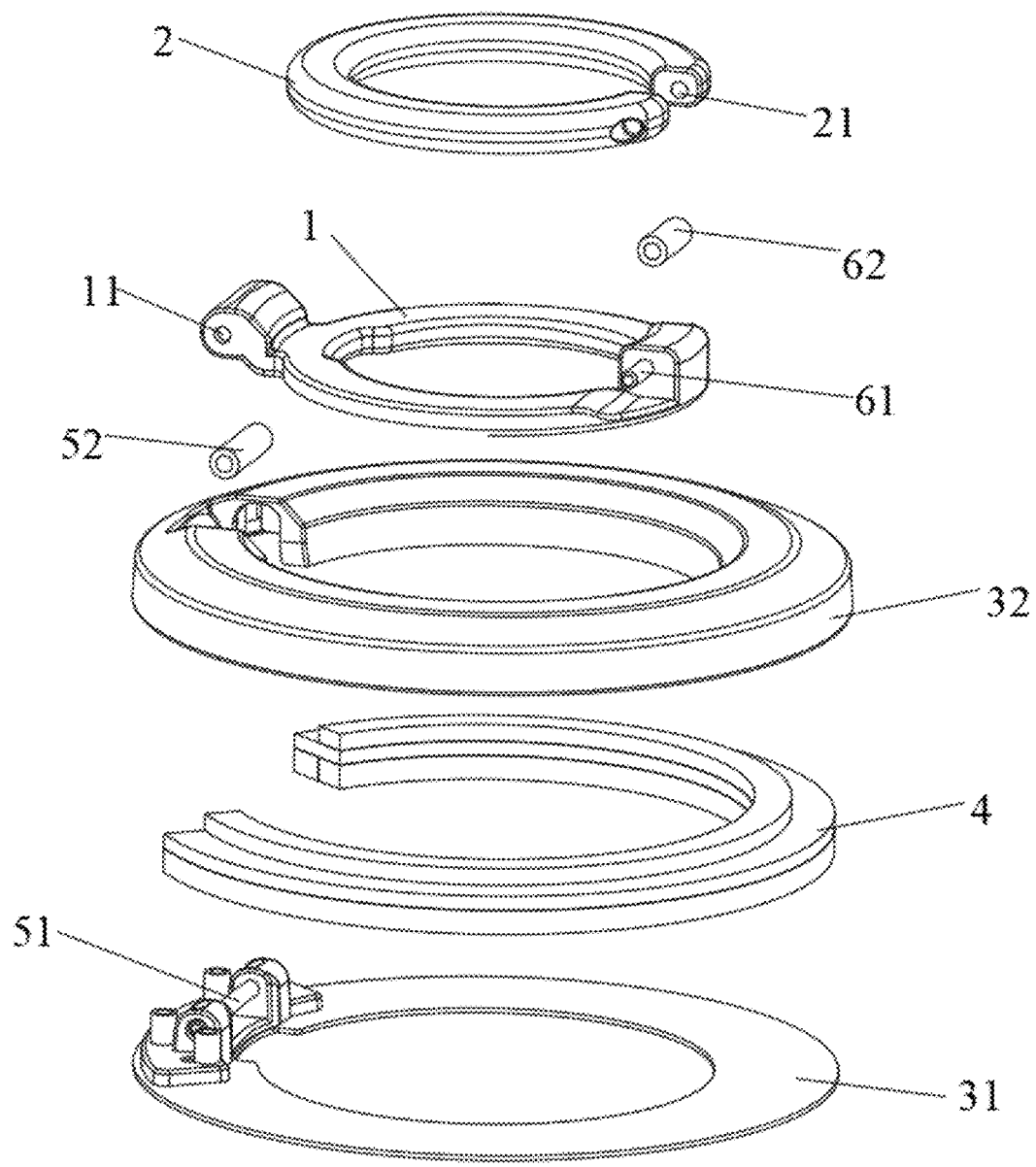
FIG. 4 is an exploded diagram of a structure of a double-ring magnetic mobile phone holder according to the present invention.

The realization of the objectives, the functional features, and the advantages of the present invention will be further explained in conjunction with the embodiments and with reference to the drawings.

DETAILED DESCRIPTION OF EMBODIMENTS

The technical solutions in the embodiments of the present invention will be clearly and completely described below with reference to the drawings in the embodiments of the present invention. It is apparent that the described embodiments are only some, but not all, embodiments of the present invention. Based on the embodiments of the present invention, all other embodiments obtained by those of ordinary skill in the art without creative efforts fall within the protection scope of the present invention.

It should be noted that, if directional indications (such as upper, lower, left, right, front and rear) are involved in the embodiments of the present invention, the directional indications are only used to explain the relative positional relationships, the motion situations and the like between individual components under a certain pose (as shown in the drawings), and if the certain pose is changed, the directional indications are changed accordingly.

In addition, if there are descriptions relating to "first", "second" and the like in the embodiments of the present invention, the descriptions of "first", "second" and the like are for descriptive purposes only and are not to be construed as indicating or implying relative importance thereof or implicitly indicating the quantities of the indicated technical features. Thus, a feature defined by "first" or "second" may explicitly or implicitly include at least one such feature. In addition, "and/or" appearing herein is meant to include three parallel solutions, and taking "A and/or B" as an example, it includes solution A, or solution B, or both solution A and solution B. In addition, the technical solutions among various embodiments may be combined with each other, however, this combination must be based on that it can be realized by those of ordinary skill in the art. When the combination of the technical solutions is contradictory or cannot be realized, such a combination of the technical solutions should not be considered to exist, and is not within the protection scope of the present invention.

An embodiment of the present invention provides a double-ring magnetic mobile phone holder, which comprises:
- a base 3;
- a first ring 1, wherein a first end of the first ring 1 is hinged to the base 3, and the first ring 1 is accommodated in an inner side of the base 3 in a first state;
- a second ring 2, wherein the second ring 2 is hinged to a second end of the first ring 1, the first end is symmetrical to the second end, and the second ring is attached to a top of the first ring in a first state; and
- a magnetic assembly 4 mounted in the base 3, wherein the magnetic assembly 4 comprises a first magnet 41, an iron sheet 43, and a second magnet 42 stacked in sequence, the first magnet 41 is configured to magnetically attract a mobile phone, and the second magnet 42 is configured to magnetically attract external metal.

This embodiment improves the structure of the existing double-ring magnetic mobile phone holder. Specifically, a double-ring structure is adopted, and according to the double-ring structure in this embodiment, the first end of the first ring 1 is hinged to the base 3, the second ring 2 is hinged to the second end of the first ring 1, and the first end is symmetrical to the second end, so that when the first ring 1 and the second ring 2 are in the second state, that is, the first ring 1 and the second ring 2 are completely unfolded, these two rings extend along one direction. In this way, the first ring 1 and the second ring 2 form a longer holder, which can support the mobile phone in a vertical state (the existing mobile phone holder usually supports the mobile phone in a horizontal direction), meet the demands of users to use mobile phones in a portrait manner, and also meet the demands of users to use mobile phones in a landscape manner. Therefore, this holder is suitable for a wider range of user usage environments.

In addition, the double-ring magnetic mobile phone holder in this embodiment integrates the magnetic attraction function and can satisfy the double-sided magnetic attraction (the magnetic holder in the prior art usually only satisfies the magnetic connection between the mobile phone holder and the mobile phone to replace the previous adhesive connection). The magnetic assembly 4 is mounted in the double-ring magnetic mobile phone holder, so that one side of the double-ring magnetic mobile phone holder can be magnetically attracted to the mobile phone, and the other side can be magnetically attracted to the external metal parts, which is particularly suitable for driving environments. The mobile phone is attracted to the metal parts in the vehicles by the double-ring magnetic mobile phone holder in this embodiment, so that the user can perform other operations such as navigation by the mobile phone. Due to the volume limitation of the base, the magnetic function is provided on the base to reduce the weight of the base. Meanwhile, the magnetic assembly is provided inside the base, and the base is at one side magnetically connected to the mobile phone, which does not cause the weight of the ring side to be too heavy, thereby causing the entire holder to easily fall off the mobile phone.

Further, the double-ring structure is adopted in this embodiment, both the first ring 1 and the second ring 2 need to be completely accommodated in the base 3 in the first state, and the first ring 1 and the second ring 2 are in a superimposed state; consequently, the thickness of the double rings affects the entire thickness of the base 3. When the thickness is constant, if the magnetic assembly is configured as an entire magnet mounted in the base 3, the cost is high. In this embodiment, the magnetic assembly 4 is configured as a three-layer structure of the first magnet 41, the iron sheet 43 and the second magnet 42. The iron sheet 43 has a magnetic attraction effect, thereby conducting the magnetic force between the first magnet 41 and the second magnet 42, so that the first magnet 41, the iron sheet 43 and the second magnet 42 form a complete large magnet with magnetic force, and the magnetic force of this large magnet is greater than that of the combination of two magnets. Therefore, at the same height and volume, the magnetic assembly 4 in this embodiment adopts fewer magnet structures, has lower cost, and connects the first magnet 41 and the second magnet 42 by the iron sheet 43, so that the magnetic force is stronger, enabling the attraction force of the double-ring magnetic mobile phone holder stronger.

It should be noted that, the double-ring magnetic mobile phone holder in this embodiment needs to be attracted to a mobile phone for a long time for use, so the magnetic force at one side of the first magnet 41 is required to be greater than that of one side of the second magnet 42, and therefore, the height of the first magnet 41 should be greater than that of the second magnet 42 to ensure the attraction stability between the double-ring magnetic mobile phone holder and the mobile phone. In this embodiment, the height of the second magnet 42 is 0.6 to 0.5 times that of the first magnet 41, and the height of the iron sheet 43 is set based on the actual height of the base 3. Specifically, the height of the first magnet 41 is set to 1.8-2.5 mm, the height of the iron sheet 43 is set to 0.9-1.5 mm, and the height of the second magnet 42 is set to 1.2-1.8 mm. Preferably, in this embodiment, the height of the second magnet 42 is 0.7 times that of the first magnet 41, the height of the first magnet is set to 2 mm, the height of the iron sheet is set to 1.2 mm, and the height of the second magnet is set to 1.4 mm.

Further, in this embodiment, the base 3 of the double-ring magnetic mobile phone holder is configured to accommodate the first ring 1 and the second ring 2, therefore, the base 3 is in a circular ring shape. The first magnet 41, the iron sheet 43, and the second magnet 42 are all configured in a circular ring shape, the first magnet 41, the iron sheet 43, and the second magnet 42 have the same inner diameter, an outer diameter of the first magnet 41 is equal to that of the iron sheet 43, and the outer diameter of the first magnet 41 is greater than that of the second magnet 42. It should be noted that the double-ring magnetic mobile phone holder requires that the magnetic force at one side of the second magnet 42 is less than that of one side of the first magnet 41. In this embodiment, the outer diameter of the second magnet 42 is less than that of the first magnet 41, so that the manufacturing cost of the magnet can be further reduced. Meanwhile, the first magnet 41, the iron sheet 43 and the second magnet 42 are integrally formed into a truncated cone that is small at the top and large at the bottom, so that the entire volume of the base 3 can be reduced.

Further, the inner diameters of the first magnet 41, the iron sheet 43 and the second magnet 42 are set to 40-46 mm, the outer diameters of the first magnet 41 and the iron sheet 43 are set to 53-59 mm, and the outer diameter of the second magnet 42 is set to 47-53 mm. Preferably, in this embodiment, the inner diameters of the first magnet 41, the iron sheet 43, and the second magnet 42 are set to 43 mm, the outer diameters of the first magnet 41 and the iron sheet 43 are set to 56 mm, and the outer diameter of the second magnet 42 is set to 50 mm.

Further, the first ring 1 is hinged to the base 3 by a first rotating mechanism 5, the first rotating mechanism 5 comprises a first rotating shaft 51 mounted on the base 3, a first damping sleeve 52 is sleeved outside the first rotating shaft 51, and the first ring 1 is provided with a first rotating hole 11 rotatably connected to the first damping sleeve 52.

Further, the second ring 2 is hinged to the first ring 1 by a second rotating mechanism 6, the second rotating mechanism 6 comprises a second rotating shaft 61 mounted on the first ring 1, a second damping sleeve 62 is sleeved outside the second rotating shaft 61, and the second ring 2 is provided with a second rotating hole 21 rotatably connected to the second damping sleeve 62.

In this embodiment, the first rotating mechanism 5 and the second rotating mechanism 6 are respectively provided with the first damping sleeve 52 and the second damping sleeve 62, so that the rotation angles of the first ring 1 and the second ring 2 can be adjusted based on actual requirements to meet the support at different angles and adapt to more complex usage environments.

Further, the base 3 comprises a bottom shell 31 and an upper cover 32 connected to each other, the magnetic assembly 4 is mounted on the bottom shell 31, and the base 3 adopts a combined structure of the bottom shell 31 and the upper cover 32 which are detachable, so that the mounting and replacement of the magnetic assembly 4 can be facilitated to increase the service life of the double-ring magnetic mobile phone holder.

Further, the first magnet 41, the iron sheet 43, and the second magnet 42 are adhered and fixed by adhesive, so as to ensure the stability of the entire magnetic assembly 4.

Further, an outer side end of the upper cover 32 is provided with a chamfer structure 33, which is matched with the magnetic assembly 4 with a structure that is small at the top and large at the bottom, so that the size of the base 3 is reduced, and the cost is reduced.

The above mentioned contents are only optional embodiments of the present invention and are not intended to limit the patent scope of the present invention, and under the invention concept of the present invention, the equivalent structural transformations made by using the contents of the specification and the drawings of the present invention, or direct/indirect applications to other related technical fields, are all included in the patent protection scope of the present invention.

The invention claimed is:

1. A double-ring magnetic mobile phone holder, comprising:
    a base;
    a first ring, wherein a first end of the first ring is hinged to the base, and the first ring is accommodated in an inner side of the base in a first state;
    a second ring, wherein the second ring is hinged to a second end of the first ring, the first end is symmetrical to the second end, and the second ring is attached to a top of the first ring in a first state; and
    a magnetic assembly mounted in the base, wherein the magnetic assembly comprises a first magnet, an iron sheet, and a second magnet stacked in sequence, the first magnet is configured to magnetically attract a mobile phone, and the second magnet is configured to magnetically attract external metal.

2. The double-ring magnetic mobile phone holder according to claim 1, wherein a height of the second magnet is 0.6-0.8 times that of the first magnet.

3. The double-ring magnetic mobile phone holder according to claim 2, wherein the height of the first magnet is set to 1.8-2.5 mm, a height of the iron sheet is set to 0.9-1.5 mm, and the height of the second magnet is set to 1.2-1.8 mm.

4. The double-ring magnetic mobile phone holder according to claim 1, wherein the first magnet, the iron sheet, and the second magnet are all configured in a circular ring shape, the first magnet, the iron sheet, and the second magnet have the same inner diameter, an outer diameter of the first magnet is equal to that of the iron sheet, and the outer diameter of the first magnet is greater than that of the second magnet.

5. The double-ring magnetic mobile phone holder according to claim 4, wherein the inner diameters of the first magnet, the iron sheet and the second magnet are set to 40-46 mm, the outer diameters of the first magnet and the iron sheet are set to 53-59 mm, and the outer diameter of the second magnet is set to 47-53 mm.

6. The double-ring magnetic mobile phone holder according to claim 1, wherein the first ring is hinged to the base by a first rotating mechanism, the first rotating mechanism comprises a first rotating shaft mounted on the base, a first damping sleeve is sleeved outside the first rotating shaft, and the first ring is provided with a first rotating hole rotatably connected to the first damping sleeve.

7. The double-ring magnetic mobile phone holder according to claim 1, wherein the second ring is hinged to the first ring by a second rotating mechanism, the second rotating mechanism comprises a second rotating shaft mounted on the first ring, a second damping sleeve is sleeved outside the second rotating shaft, and the second ring is provided with a second rotating hole rotatably connected to the second damping sleeve.

8. The double-ring magnetic mobile phone holder according to claim 1, wherein the base comprises a bottom shell and an upper cover connected to each other, and the magnetic assembly is mounted on the bottom shell.

9. The double-ring magnetic mobile phone holder according to claim 8, wherein the first magnet, the iron sheet, and the second magnet are adhered and fixed by adhesive.

10. The double-ring magnetic mobile phone holder according to claim 8, wherein an outer side end of the upper cover is provided with a chamfer structure.

\* \* \* \* \*